Nov. 28, 1939.                H. R. TRAPHAGEN                2,181,441
CHECK-ROW PLANTER
Filed June 8, 1936
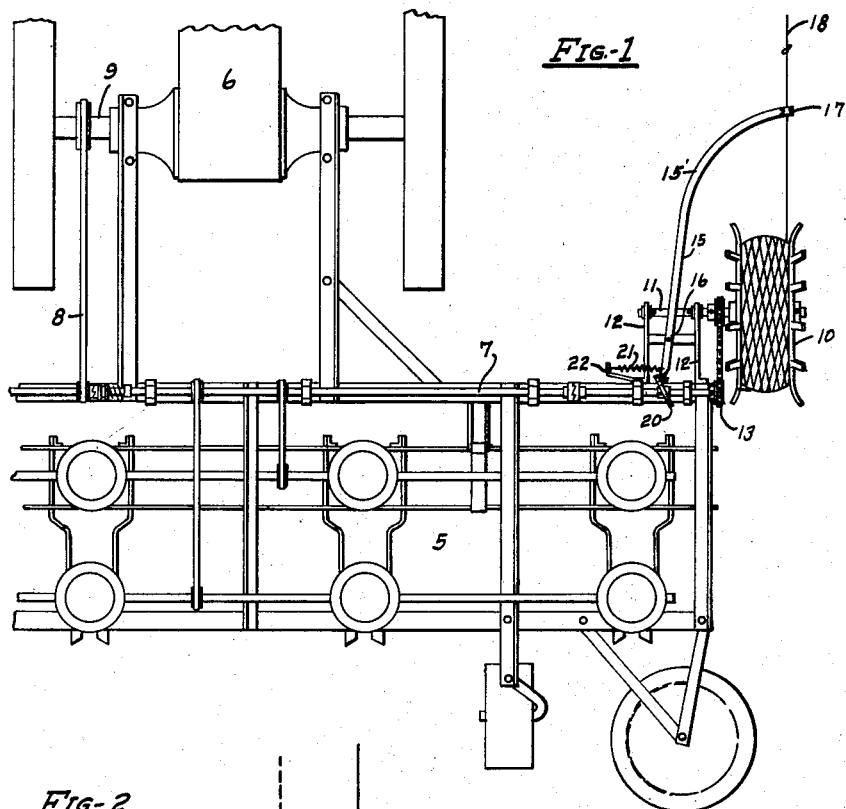
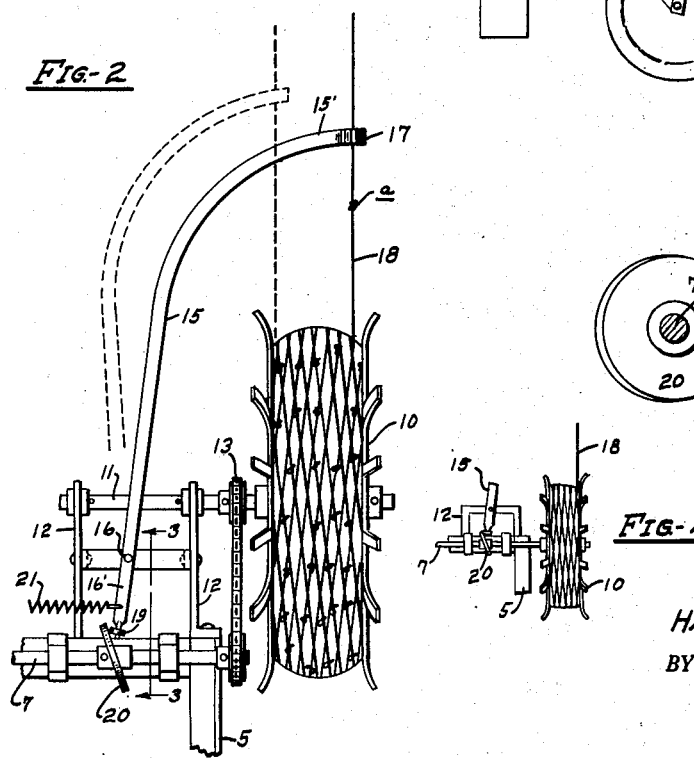
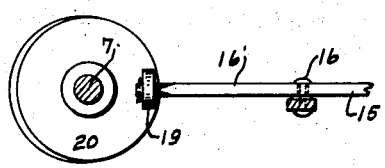
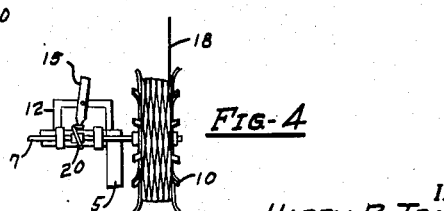
INVENTOR.
HARRY R. TRAPHAGEN
BY James A. Walsh
ATTORNEY Patented Nov. 28, 1939

2,181,441

UNITED STATES PATENT OFFICE 2,181,441

CHECK-ROW PLANTER

Harry R. Traphagen, Rockford, Ill., assignor to J. I. Case Company, Racine, Wis., a corporation Application June 8, 1936, Serial No. 84,055

2 Claims. (Cl. 242—92)

In the operation of check-row planters it is customary to employ a reel about which a wire is wound which is provided with wire buttons at predetermined intervals adapted to be tripped as the implement travels through a field so that certain mechanisms will be actuated through such tripping action to deposit seed in the earth in a manner well known. The winding of such wire about the reel, so far as I am aware, consists in a plurality of closely adjacent turns in parallel relation, and, as each turn includes several buttons forming part of the wire, it will be readily understood that such wire, which is many feet in length, when wound about the reel is not only of a bulky character but is more or less in an entangled condition for the reason that some of the buttons become interlocked with turns of the wire adjacent thereto, which condition interferes with the proper operation of the unreeling of the wire and requires considerable time and labor in correcting. It is my object, therefore, to provide means for so winding the wire about a planter reel as to obviate the entanglement referred to, and to wind the turns of wire in reverse diagonal relation so that adjacent turns will not contact and thus insure free feeding thereof onto or off the reel without the difficulties now commonly experienced.

In the accompanying drawing, forming part hereof, Figure 1 is a plan view in fragment of a check-row planter of desired construction equipped with a reel and my improved mechanism for controlling the winding and unwinding of the wire about the same; Fig. 2, a detail plan view of the improvement; Fig. 3 is a detail of the wire guide and actuating means therefor, taken on the dotted line 3—3 in Fig. 2, and Fig. 4 is a fragmentary plan view of a modified form of the improvement.

In said drawing the numeral 5 indicates a planter adapted to be drawn and operated by a tractor 6, a shaft 7 on the planter being driven by a sprocket system 8 connecting the tractor axle 9 to said shaft 7. Upon said planter 5 I mount a reel 10 having a shaft 11 secured in supports 12 on the planter, and which shaft 11 is connected by a driving system 13 connecting it to the planter drive shaft 7 to impart rotary motion to the reel 10. Upon supports 12 a guide-arm 15 is pivotally secured, as at 16, preferably having a curved outer end 15', embodying or upon which a guide 17 is mounted and through which the check-wire 18 runs, the opposite end 16' of the guide-arm carrying a roller 19 adapted to engage a wabble-plate 20 on shaft 7, and the lateral movement of said guide-arm being controlled by a spring 21 connected thereto and to a keeper 22 on the planter.

In operation, the reel 10 is rotated by shaft 7 through the driving system 13 and the reel shaft 11, and when winding wire about the reel the wire is passed through the guide 17 and turned about the under side of the reel, which latter is then rotated through power from the tractor substantially as described, and simultaneously with such rotation the wabble-plate 20 on shaft 7 is rotated to actuate roller 19, the eccentric rotation of the wabble-plate causing the guide-arm 15 to oscillate laterally, with the result that said arm is moving comparatively fast in the directions indicated by full and dotted lines in Fig. 2, carrying the wire gradually from side to side of the reel and causing the turns of the wire to assume reverse diagonal positions in relation to the reel and to each other, so that the turns will lie in spaced criss-cross arrangement about the reel, which turns as well as the buttons $a$ will be superimposed in a manner as not to become wedged between others, and consequently there is no interlocking of the wire buttons with turns of the wire to entangle the assemblage in a manner which is quite common in the ordinary winding of the check-wire of planters as commonly practiced.

While I have specifically described the preferred form of reel control indicated in Fig. 2 I desire it to be understood that I may mount the reel 10 on the drive shaft 7, associating with said shaft the support 12, guide 15 and wabble-plate 20, Fig. 4, to accomplish the winding and unwinding of wire 18 about the reel in the manner described.

I claim as my invention:

1. In a winding mechanism for a planter having a driving shaft, a reel having a shaft mounted on the planter, means connecting said shafts for driving the reel shaft at a speed somewhat different from the driving shaft, a guide-arm pivotally supported on the planter, a wabble-plate on the driving shaft engaging and actuating the guide-arm to swing laterally in relation to the reel, and means on the guide-arm for retaining a wire and guiding the latter to be wound in diagonal turns in relation to the reel when the latter is rotated.

2. In a winding mechanism for the check wire of a planter having driving means, a reel, means connected with the driving means for rotating the reel for winding the wire thereon, guiding means arranged for guiding the wire from side to side to fill the reel, and actuating means for the guiding means arranged to cause complete cycles of the guiding means substantially, but not exactly, in synchronism with the turns of the reel for winding wire embodying buttons about the reel in spaced diagonal turns at substantial angles to the axis of the reel to prevent the buttons from becoming entangled with adjacent turns of the wire whereby to facilitate the unwinding of the wire from the reel.

HARRY R. TRAPHAGEN.